Sept. 23, 1969  V. E. SHELTON  3,469,016
INTERCONNECTION BETWEEN EXTERNAL SHIELD AND INTERNAL CONDUCTOR
Filed Nov. 30, 1967

INVENTOR.
VERNON E. SHELTON,
BY
Robert Thompson
ATTORNEY.

United States Patent Office 3,469,016
Patented Sept. 23, 1969

3,469,016
INTERCONNECTION BETWEEN EXTERNAL SHIELD AND INTERNAL CONDUCTOR
Vernon E. Shelton, Manhattan Beach, Calif., assignor to Hughes Aircraft Company, Culver City, Calif., a corporation of Delaware
Filed Nov. 30, 1967, Ser. No. 687,003
Int. Cl. H01b 11/06
U.S. Cl. 174—36                8 Claims

ABSTRACT OF THE DISCLOSURE

A shielded cable, comprising a flat electrical insulation material having a plurality of flat conductors enclosed therein which are disposed in parallel spaced-apart relationship to each other, the cable having a plurality of perforations through the insulation material and at least one conductor. An electrical conductive coating covers the exterior of the insulation and enters the perforations to mechanically bond and to electrically couple with the conductor.

---

This invention relates, in general, to improvements in shielded multiconductor, flat, flexible, electrical cables, and more particularly to means for and methods of electrically interconnecting an external shield to an internal conductor.

Multiconductor, flat, flexible cables, hereinafter also referred to as flat cables, have come into extensive use. They generally include a ribbon or tape of an insulation material having a plurality of thin, flat conductors enclosed therein which are disposed in parallel spaced-apart relationship to each other. In some applications, flat cables are required to be electrically shielded. When an electrical shielding is required, the exterior of the cable can be covered with electrical conductive material which will function as an electrical shield.

However, in certain applications, it is desirable for the shield to be electrically connected to at least one of the conductors. One way of connecting the shield to a conductor has been to grind or abrade away the insulation material to expose a conductor and then apply an electrical conductive coating material. The coating material filled the voids in the insulation formed by the grinding and adhered to the exposed conductor, whereupon electrical connection was made.

An object of this invention is to provide improved means for an methods of interconnecting an electrical shield to a conductor of a shielded multiconductor, flat, flexible cable.

Another object of this invention is to provide improved means for and methods of making an electrical coupling between a conductor and shield in a flat, flexible cable which means and methods have the advantage of facility of manufacture, good electrical characteristics, and high reliability.

The above and other objectives of this invention can be attained by improvements in making a plurality of perforations through the insulation of and through at least one conductor of a multiconductor, flat, flexible cable, or flat cable, and providing an electrical shield for the flat cable by applying an electrical conductive coating material to the exterior of the flat cable. The electrical conductive coating material covers the exterior of the flat cable and enters the perforations, to mechanically bond with the conductor. That portion of the coating material that covers the exterior of the flat cable provides an electrical shield which suppresses the effects of electrostatic fields. Furthermore, that portion of the coating material that enters the perforations and bonds to the conductor forms an electrical coupling between the electrical shield and conductor. Thereafter the conductor can be connected to a reference voltage or be grounded to provide an improved grounded electrical shield.

Figure 1:
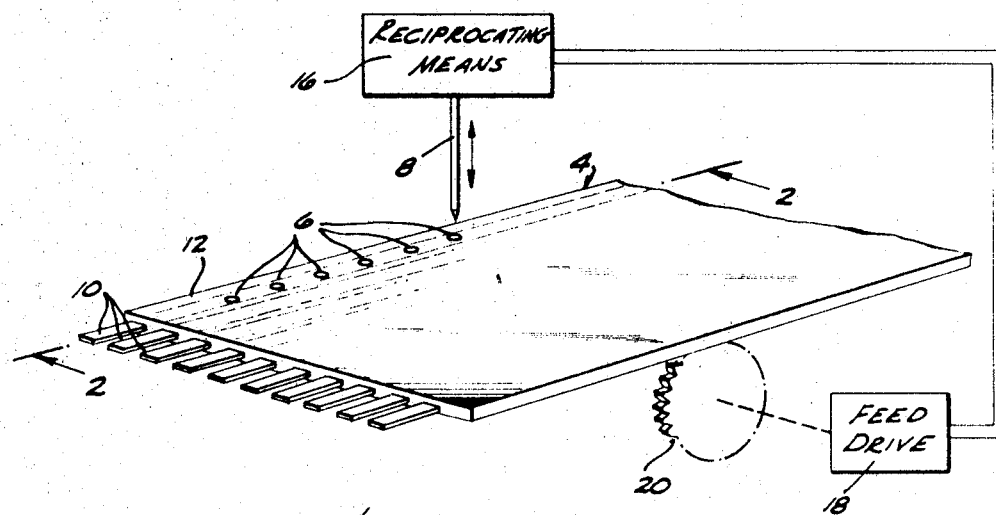
Figure 2:
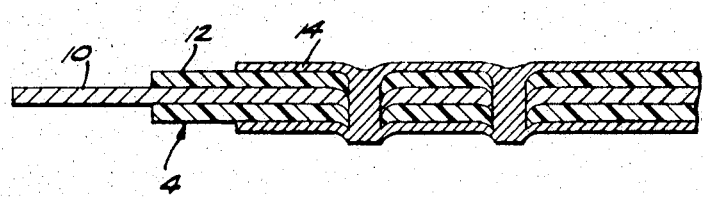

Other objects, features, and advantages of this invention will become apparent upon reading the following detailed description, and referring to the accompanying drawings, in which:

FIGURE 1 is a perspective view of a multiconductor, flat, flexible cable having a plurality of perforations therein in registry with one conductor, and a means for making the perforations; and FIG. 2 is an enlarged cross-sectional side view of a multiconductor, flat, flexible cable taken along the line 2—2 of FIG. 1 through the perforations, after an electrical conducting coating material has been applied to the exterior.

Referring to the drawings, wherein like reference characters designate like or corresponding parts, there is shown in FIG. 1 a multiconductor, flat, flexible cable 4 with a plurality of perforations 6 formed therein and a perforating means 8 for making the perforations 6.

The flat cable 4 includes a plurality of parallel, laterally spaced-apart conductors 10, of electrically conductive material, that are enclosed within an electrical insulation material 12. The conductors 10 in the flat cable 4 are flat copper ribbon or can be other feasible configurations. The conductors 10 are commonly sandwiched between two lamina of flat ribbons or tapes of electrical insulation material 12. Any suitable electrical insulation material 12, such as adhesive polyester or fluorinated ethylene propylene, can be used. The lamina of insulation material 12 are generally bonded together by heat sealing or with an adhesive to enclose the conductors. The resulting flat cable 4 generally has mechanical characteristics of the type which allow bending, folding, flexing or otherwise contouring the cable.

The perforating means 8 makes a series of perforations 6 or voids in the cable by piercing through the insulation material 12 to a conductor 10. The perforations 6 expose the conductors 10 at each of the perforations 6 whereat, as will be explained with reference to FIG. 2, an electrical connection and mechanical bond can be made between the conductor 10 and an electrical conducting coating material 14 which operates as an electrical shield.

The perforations 6 in the flat cable 4 can be made by reciprocating the perforator 8 with a reciprocating means 16 such that the perforator 8 pierces into or through the insulation material 12 and at least one of the conductors 10. One type of reciprocating means 16 can be an electrically actuated punch. The cable is fed past the perforator 8 by a feed means such as a feed drive 18 having a rotatable output shaft which is connected to a sprocket wheel 20 or a take-up wheel positioned to engage the surface of the flat cable and feed the cable past a perforating station. The feed drive 18 is synchronized to operate with the reciprocating means 16 in response to control signals therefrom so that as the flat cable is incrementally fed past the perforator 8, a series of evenly spaced perforations 6 is made in the flat cable in a line in registry with at least one of the conductors 10, thereby forming voids which expose the conductor 10 whereat electrical coupling with the conductor 10 can be made. Of course, it should be understood that other patterns of perforations could be made, and that the perforating could be performed by mechanical means or manually.

Although the perforations 6 are illustrated as being through a flat cable 4, it should be understood that it is only necessary that the perforations 6 penetrate enough insulation 12 to expose the conductor 10, thereby allowing contact or electrical coupling to be made with a least one of the cable conductors 10.

In this regard, since the insulation material 12 is generally made up of two laminae of a ribbon or tape of insulation material, the laminae of insulation material associated with one or both sides of the conductors 10 could conceivably be perforated before laminating the insulation material 12 on opposite sides of the conductors 10. The perforations 6 can, of course, be made in the insulation material 12 by the techniqnue described above, or by other techniques. When the insulation material 12 is laminated on opposite sides of the plurality of parallel disposed conductors 10, the perforations 6 in the insulation material 12 are in registry or alignment with one of the conductors 10. Then after lamination, the plurality of perforations 6 in the insulation material 12 expose a conductor 10 to which mechanical bond and electrical coupling can be made.

A cross-sectional view (not to scale) taken through the perforations 6 of the flat cable 4, after an electrical conductive coating material 14 has been applied to the exterior thereof, is illustrated in FIG. 2. Any suitable coating material 14 that is electrically conductive and flexible, such as Silver Preparation #5504A, manufactured by E. I. du Pont de Nemours and Co. and described in Du Pont Bulletin CP2–666, "Conductive Silver Preparations" can be used. The coating material 14 is generally a fluid-containing, electrical conductive material which can be applied with a brush, by spraying, dipping, or other suitable means. The coating material 14 covers the exterior of the flat cable 4 and fills the perforations 6. That portion of the coating material 14 that covers the cable operates as an electrical shield. The portion of the coating material 14 that fills the perforations 6 contacts the exposed portion of the conductor 10 and is operable to provide an electrical coupling between the portion of the coating material 14 that operates as an electrical shield and conductor 10, thereby enabling the coating material 14 to be electrically grounded when it operates as an electrical shield.

When the coating material 14 that fills the perforations 6 cures, either by aging or by a heat treatment, it mechanically bonds to the insulation material 12 and the conductor 10, while still retaining its flexibility. The curing by heat treatment can take several hours and can be started at temperatures between 100° F. and 120° F., raised to about 290° F. after an hour, and subsequently raised slowly to 390° F. for two hours.

The area of mechanical bond between the coating material 14 and the conductor 10, as previously stated, forms the areas of electrical coupling between the coating material 14 and the conductor 10. Similar bonds and connections result between the conductor 10 and coating material 14 at each of the perforations 6. An advantage of this technique is that low electrical resistance between any point on the shield and the conductor 10 results. Also, the plurality of bonds has the advantage that the probability of failure due to a complete loss of electrical coupling between the electrical shield and conductor 10, as a result of mechanical failure, is very low, resulting in high reliability of the shielded cable.

In the enlarged cross-sectional view of the perforations 6 and the mechanical bond between the coating material 14 and the conductor 10, illustrated in FIG. 2, the conductor 10 is illustrated as being deformed or disposed out of a flat plane due to the perforations 6. Therefore, the area of contact between the conductor 10 and the coating material 14 is about equal to the area of the exposed portion of the deformed or disposed conductor 10. In addition, the coating material will contact the exposed, deformed portion of conductor 10 and can form a mechanical interlock with it. However, the conductor 10 could conceivably be perforated without being deformed or disposed out of a flat plane, in which case, the area of the bond would be about equal to the cross-sectional area of the wall of the perforation through the conductor 10.

While the salient features have been illustrated and described with respect to particular embodiments, it should be readily apparent that modifications can be made within the spirit and scope of the invention.

What is claimed is:
1. A shielded electrical cable, comprising:
   a plurality of conductors;
   an insulation material enclosing said conductors and having a plurality of perforations therethrough in registry with at least one of said conductors;
   an electrically conductive material covering the exterior of said insulation and establishing a bond and electrical contact through the perforations, between said electrically conductive material and the at least one of said conductors.
2. The shielded electrical cable of claim 1 in which said plurality of conductors include flat ribbons of electrical conductive material.
3. The shielded electrical cable of claim 2 in which said insulation material is comprised of two laminae of a ribbon-like insulation material.
4. The shielded electrical cable of claim 3 in which the plurality of perforations are made through at least one of said ribbon-like insulation materials.
5. The shielded electrical cable of claim 4 in which at least one of said plurality of conductors has a plurality of perforations therein in registry with said plurality of perforations in said ribbon-like insulation material.
6. The shielded electrical cable of claim 5 in which the plurality of perforations in the at least one of said plurality of conductors and said ribbon-like insulation material is a series of equally spaced and aligned perforations.
7. The shielded electrical cable of claim 1 in which at least one of said plurality of conductors has a plurality of perforations therein in registry with the plurality of perforations in said insulation material.
8. The shielded electrical cable of claim 7 in which the plurality of perforations is a series of equally spaced and aligned perforations.

References Cited

UNITED STATES PATENTS

| | | | |
|---|---|---|---|
| 3,209,284 | 9/1965 | Hast | 333—10 |
| 3,221,095 | 11/1965 | Cook | 174—68.5 |
| 3,135,935 | 6/1964 | Engelbrect | 174—117 X |
| 3,173,991 | 3/1965 | Breakfield | 174—117 |
| 3,239,916 | 3/1966 | Love | 174—117 X |
| 3,168,617 | 2/1965 | Richter | 174—117 |
| 3,350,498 | 10/1967 | Leeds | 333—84 X |

OTHER REFERENCES

Cooper, P. B.: Ribbon Cables Show Their Versatility in Electronic Design, pp. 32–35, Feb. 15, 1965, vol. 13, No. 4.

LEWIS H. MYERS, Primary Examiner

A. T. GRIMLEY, Assistant Examiner

U.S. Cl. X.R.

174—117, 133; 333—84